United States Patent Office 2,917,547
Patented Dec. 15, 1959

2,917,547

MANUFACTURE OF LIQUID ALKYLPENTA-BORANE-9

Robert E. Williams, Pasadena, Calif., assignor, by mesne assignments, to Olin Mathieson Chemical Corporation, a corporation of Virginia No Drawing. Application September 21, 1956
Serial No. 611,361

8 Claims. (Cl. 260—606.5)

This invention relates to the manufacture of liquid alkylated pentaboranes, materials which can be used as fuels as described in Altwicker, Garrett, Weilmuenster and Harris application Serial No. 497,408, filed March 28, 1955.

In accordance with the present invention, it has been discovered that pentaborane and lower trialkyl borates can be reacted in admixture with an alkylation catalyst to form liquid alkylated pentaboranes. The lower alkylborates which can be used are those which contain from 1 to 5 carbon atoms in each alkyl radical, among them being trimethylborate, triethylborate, tri-n-butylborate and the like. A wide variety of alkylation catalysts can be employed for the purpose of promoting the reaction between the pentaborane and the alkylborate, among them being aluminum chloride, aluminum bromide, ferric chloride, ferric bromide and so forth. Preferably, the quantity of trialkylborate used will be within the range from about 0.2 to 1 mole of trialkylborate per mole of pentaborane, and the quantity of catalyst used will be within the range from about 0.6 to 4 moles of catalyst per mole of pentaborane. The temperature employed in carrying out the reaction can be varied widely from about $-20°$ C. to $150°$ C., preferably from $0°$ C. to $120°$ C. The alkyl pentaboranes produced by carrying out the reaction can be separated from the reaction mixture by using conventional fractionation, preferably vacuum fractionation.

The following examples illustrate embodiments falling within the scope of this invention.

*Example I*

In the first step of this experiment 5 grams of reagent grade aluminum chloride was placed in a 50 ml. test tube which was then attached to a vacuum line. After the tube had been evacuated sufficient heat was applied through the test tube wall to cause a small quantity of the aluminum chloride to sublime out on the tube wall. A second 50 ml. test tube containing 0.2 cubic centimeter (approximately 0.26 gram) of trimethylborate was then attached to the vacuum line and the tube evacuated. A bath containing liquid nitrogen was placed around the test tube containing the aluminum chloride catalyst and the trimethylborate was condensed into the tube containing the aluminum chloride. In the next step 1.5 ml. (0.95 gram) of pentaborane was condensed into the tube containing the aluminum chloride and trimethylborate. As soon as the pentaborane had been added the test tube was sealed off and the bath containing liquid nitrogen was removed. The test tube was then allowed to warm up to room temperature and to remain at this temperature for about 17 hours. Next the tube and contents were warmed to $100°$ C. over a one and one half hour period by placing a container of boiling water around the test tube. At the end of this heating period there was some evidence of reaction in that the aluminum chloride became yellow. After being cooled to $-196°$ C. by immersion in a bath containing liquid nitrogen, the test tube was reattached to the vacuum line and the non-condensible gases were pumped off. The reaction mixture was then allowed to warm up by removing the nitrogen bath until a pressure of 10 mm. was indicated in the line and in a sample tube attached to the line. The sample tube was cooled to $-196°$ C. by placing a bath containing liquid nitrogen around the tube and the tube was sealed off. Mass spectrographic analysis of this sample showed that substantial quantities of methylpentaborane were present along with unreacted pentaborane. In addition there was formed a small amount of methyl chloride. Fractional distillation of the reaction mixture yields methylpentaborane.

*Example II*

To a 50 ml. test tube was added 5 grams of aluminum chloride and the tube was attached to a vacuum line. After the test tube had been evacuated, heat from an open flame was applied externally to the test tube until a small quantity of the aluminum chloride had sublimed out on the walls of the tube. A second tube of 50 ml. capacity to which had been added 0.6 ml. of commercial triisopropyl borate was attached to the vacuum line. A bath containing liquid nitrogen was placed around a test tube holding the aluminum chloride catalyst and the triisopropyl borate was transferred to this test tube by condensation. In the next step there was condensed into the test tube containing the triisopropyl borate and aluminum chloride 1.5 ml. (0.95 g.) of pentaborane. The test tube was sealed off, the nitrogen bath removed and the tube allowed to warm up to room temperature. A period of about 15 minutes was required for the tube to reach room temperature. The reaction was allowed to proceed for one hour at room temperature and then the test tube and contents were warmed to $100°$ C. for approximately 5 minutes by immersing the test tube in a beaker containing boiling water. After being cooled to $-196°$ C., the test tube was held for a period of five minutes in order to remove non-condensibles. The liquid nitrogen container was removed from around the product and the product allowed to warm up until the pressure in the system was 5 mm. of mercury. At this pressure, a 50 ml. sample tube which had previously been connected to the system was cooled down by surrounding it with a cold bath containing liquid nitrogen and the sample tube sealed off. Most of the liquid product remaining was removed by vacuum evaporation and discarded. Then a second sample from the remaining liquid was collected by allowing the system to warm up until the pressure reached 5 mm. of mercury.

Both samples were analyzed in a mass spectrometer and it was shown that sample 1 contained mostly pentaborane and some propylpentaborane. Sample 2 was shown to contain a high percentage of propylpentaborane and a small quantity of pentaborane. Thus, fractional distillation of the reaction mixture yields propylpentaborane.

*Example III*

To a 50 ml. test tube there was added 2.5 grams of aluminum chloride and 0.3 ml. of tributyl borate. The test tube was attached to a vacuum line and evacuated. In the next step 0.5 ml. (0.31 gram) of pentaborane was condensed into the test tube which had previously been cooled to $-196°$ C. by immersing it in a bath containing liquid nitrogen. The test tube was sealed off and allowed to stand at room temperature overnight. Then the tube was heated to $100°$ C. for ten minutes by immersion in a bath containing boiling water. Next the test tube was attached to the vacuum line, cooled to $-196°$ C. by immersing in a bath containing liquid nitrogen, and the noncondensibles removed from the test tube by pumping. The nitrogen bath was then removed from around the product and the reaction mixture allowed to warm up until the pressure in the system and in a sample tube which had previously been attached to the system, was 5 mm. of mercury. The first sample tube was then cooled to −196° C. by immersion in a bath containing liquid nitrogen, the tube sealed off, and a sample analyzed in the mass spectrometer. After collecting the first sample the majority of the liquid reaction product was removed from the system by vacuum evaporation and discarded. A second sample was then collected by allowing the system to warm up until the pressure of the system was 5 mm. of mercury. This second sample tube was cooled to −196° C., the tube was sealed off and the samples, as obtained, analyzed in the mass spectrometer. The analyses showed that the sample then contained principally pure pentaborane with a trace of ethylpentaborane while sample 2 contained substantial quantities of butyl pentaborane and pentaborane.

It is claimed:

1. A method for the preparation of a liquid alkylated pentaborane-9 which comprises contacting a trialkylborate containing from 1 to 5 carbon atoms in each alkyl radical and pentaborane-9 while the reaction mixture contains a catalytic amount of an alkylation catalyst selected from the group consisting of aluminum chloride, aluminum bromide, ferric chloride and ferric bromide.

2. A method for the preparation of a liquid alkylated pentaborane-9 which comprises reacting from 0.2 to 1 mole of a trialkylborate containing from 1 to 5 carbon atoms in each alkyl radical per mole of pentaborane-9 at a temperature within the range from −20° C. to 150° C. while the reaction mixture contains from 0.6 to 4 moles of an alkylation catalyst selected from the group consisting of aluminum chloride, aluminum bromide, ferric chloride and ferric bromide.

3. The method of claim 2 wherein said alkylation catalyst is aluminum chloride.

4. The method of claim 2 wherein said alkylation catalyst is aluminum bromide.

5. The method of claim 2 wherein said alkylation catalyst is ferric chloride.

6. The method of claim 2 wherein said alkylation catalyst is aluminum chloride and wherein said borate is trimethylborate.

7. The method of claim 2 wherein said alkylation catalyst is aluminum chloride and wherein said borate is triisopropylborate.

8. The method of claim 2 wherein said alkylation catalyst is aluminum chloride and wherein said borate is tributylborate.

No references cited.